US007077151B2

(12) United States Patent
Targosz et al.

(10) Patent No.: US 7,077,151 B2
(45) Date of Patent: Jul. 18, 2006

(54) SHOCK ELIMINATION FOR FILLING SYSTEM

(76) Inventors: Tomasz R. Targosz, 2402 Battersea Pl., Apt., #404, Baltimore, MD (US) 21244; Randy Steffen, 429 Redman Dr., Ripon, WI (US) 54971

(*) Notice: Subject to any disclaimer, the term of this patent is extended or adjusted under 35 U.S.C. 154(b) by 17 days.

(21) Appl. No.: 10/859,111

(22) Filed: Jun. 3, 2004

(65) Prior Publication Data

US 2004/0216779 A1 Nov. 4, 2004

Related U.S. Application Data

(63) Continuation of application No. 10/462,653, filed on Jun. 17, 2003, now abandoned, which is a continuation of application No. 09/839,599, filed on Apr. 23, 2001, now Pat. No. 6,578,595.

(51) Int. Cl.
*G05D 7/00* (2006.01)

(52) U.S. Cl. .................................... 137/15.04; 137/240

(58) Field of Classification Search ................. 137/240, 137/238, 15.01, 15.04, 15.05
See application file for complete search history.

(56) References Cited

U.S. PATENT DOCUMENTS

| | | | | | |
|---|---|---|---|---|---|
| 3,385,735 | A | * | 5/1968 | Braband et al. | 137/15.04 |
| 5,787,928 | A | * | 8/1998 | Allen et al. | 137/240 |
| 6,142,169 | A | * | 11/2000 | Lees et al. | 137/240 |
| 6,446,659 | B1 | * | 9/2002 | Schroeder | 137/240 |

* cited by examiner

*Primary Examiner*—Kevin Lee
(74) *Attorney, Agent, or Firm*—Miles & Stockbridge P.C.; Edward J. Kondracki

(57) ABSTRACT

A product fill system and method uses a mode valve. The mode valve is a shuttle valve that allows the shock tube to communicate with the filler valve during a fill operation corresponding to fill mode of the mode valve. If the filler valve is shut off, any overpressure can pass through the mode valve and be absorbed by the shock tube. The mode valve can be switched into a clean mode in which the shock tube is connected more directly in the circuit between the upstream side of the mode valve and the filler valve. In other words, the shock tube is on a side circuit of the main circuit used for product feeding during the fill operation. However, during the clean operation, the shock tube is in the circuit such that cleaning material travels completely throughout the shock tube. The method of the present invention involves the use of the product fill system so as to accommodate cleaning without disassembly of parts.

20 Claims, 1 Drawing Sheet

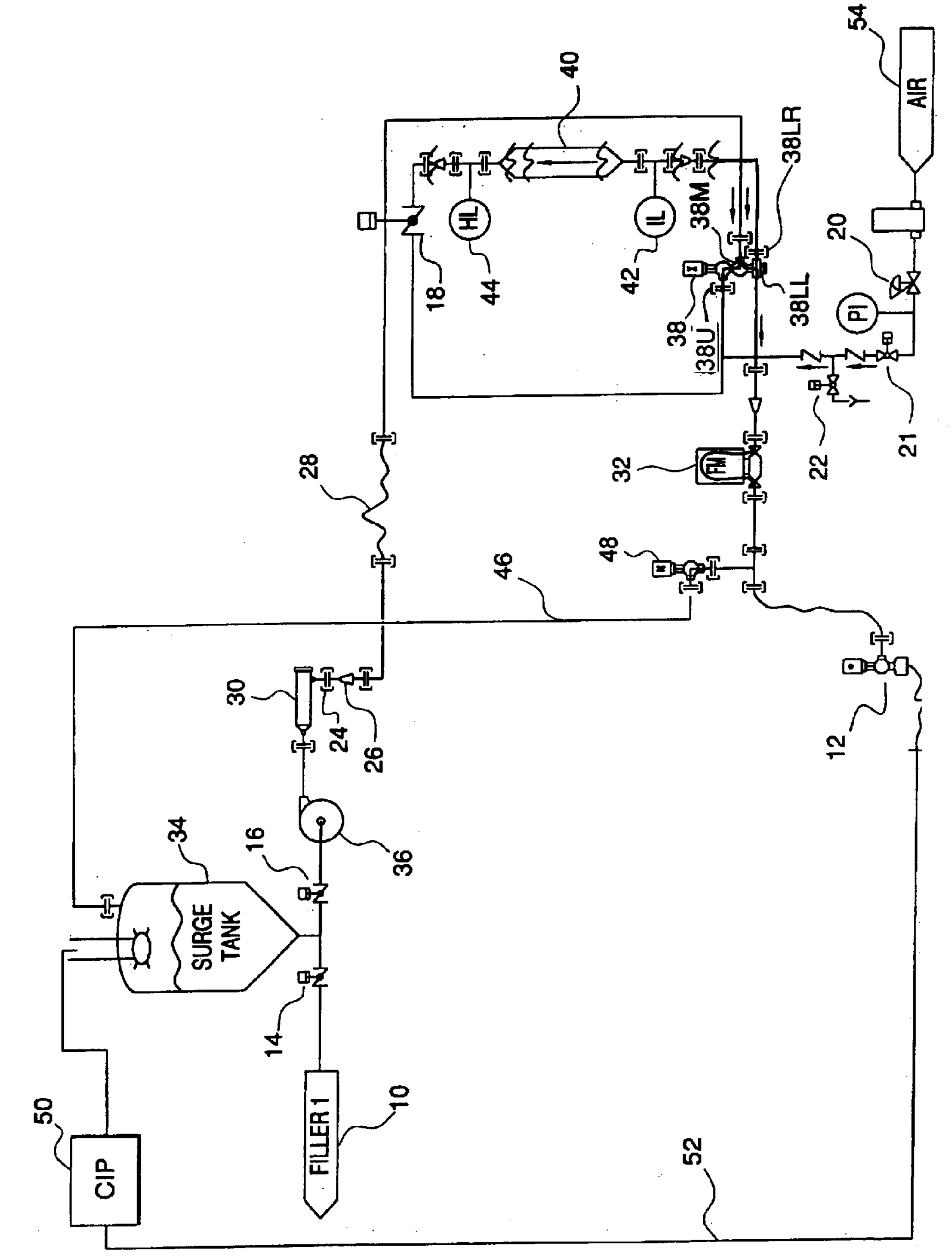
AIR
54
40
38LR
38M
20
HL
IL
18
44
42
38
38LL
38U
PI
FM
32
22
21
28
46
48
30
24
26
12
16
34
SURGE TANK
36
14
50
CIP
FILLER 1
10
52

SHOCK ELIMINATION FOR FILLING SYSTEM

This application is a continuation of Ser. No 10/462,653 filed Jun. 17, 2003 abandoned which is a continuation of Ser. No. 09/839,599 filed on Apr. 23, 2001 now U.S. Pat. No. 6,578,595.

BACKGROUND OF THE INVENTION

The field of the invention is filling methods and systems for filling containers with fluid. More particularly, the invention relates to the reduction or elimination of shock when such systems are cleaned in place (CIP).

Various systems have been used in order to fill bags or other containers with fluid or granular material exhibiting fluid like characteristics.

Especially when the fluid or material is used in food products, the system must be kept relatively clean. Such systems use pressure to force the liquid or other product through a series of pipes and into containers.

When a thorough cleaning of such a system is needed, it often has required disassembly. Such disassembly is quite time-consuming and, accordingly, results in much expense associated with a down time (non-operational time) of the system.

When it is necessary to stop the normal fill operations of such a system for cleaning, one must disconnect the pressure source that is pushing the fluid or other material into the containers. This often results in a hydraulic shock or hammer effect similar to when a home owner suddenly turns off a pipe running at full capacity. A vibration of the pipe occurs from this shock effect. In the context of product fill systems, such repeated shocks can damage pipes and other components in the supply lines.

Although various techniques have been used to try to absorb or minimize adverse effects from shocks in product fill systems, they have generally been subject to one or more of several disadvantages. In particular, many have required components that will need replacement in a relatively short time. Some are not very effective at reducing shock. Some may waste product when the shock occurs. Some techniques may absorb shock, but interfere or greatly complicate clean in place (CIP) procedures.

BRIEF SUMMARY OF THE INVENTION

Accordingly, it is a primary object of the present invention to provide a new and improved shock elimination technique in a product fill system and method.

A more specific object of the invention is to product shock elimination in a manner that is compatible with a clean in place (CIP) technique.

Yet another object of the present invention is to avoid many of the disadvantages of prior systems noted above.

The above and other features of the present invention are realized by a product fill system having a shock tube disposed to communicate with a filler valve by way of a mode valve. The mode valve is a shuttle valve that allows the shock tube to communicate with the filler valve during a fill operation corresponding to fill mode of the mode valve. If the filler valve is shut off, any overpressure can pass through the mode valve and be absorbed by the shock tube. The mode valve can be switched into a clean mode in which the shock tube is connected more directly in the circuit between the upstream side of the mode valve and the filler valve. In other words, the shock tube is on a side circuit of the main circuit used for product feeding during the fill operation. However, during the clean operation, the shock tube is in the circuit such that cleaning material travels completely throughout the shock tube. The method of the present invention involves the use of the product fill system so as to accommodate cleaning without disassembly of parts.

BRIEF DESCRIPTION OF THE DRAWINGS

FIG. 1 is simplified schematic of the present invention.

DETAILED DESCRIPTION OF THE INVENTION

Turning now to FIG. 1, the system of the present invention will be described in detail. Many of the components are more or less standard components such that their construction and operation will not be discussed in detail. Instead, the discussion will concentrate on the other features and operations.

A filler 10 is a circuit (details not shown) supplying product to containers (not shown). A particular filler arrangement is shown on the right of FIG. 1 and is used to fill product to containers (not shown) disposed below the filler valve 12. Butterfly valves 14 and 16 are used to gate product flow, whereas butterfly valves 18, 20, 21, and 22 are on side circuits as will be discussed below. Various connectors 24 and reducers 26 are in the hydraulic circuit of FIG. 1, but only one of each is labeled. A flexible table portion 28, strainer 30, flow meter 32, surge tank 34, centrifugal pump 36 are among the other components.

An important aspect of the present invention is the use of the four port shuttle valve 38 in connection with a shock tube 40. The four ports are upper port 38U, middle port 38M, lower left port 38LL, and lower right port 38LR. They may also be referred to as first port 38M, second port 38LL, third port 38LR, and fourth port 38U. Various ports will be connected depending on the mode of operation of the system. The shock tube 40 has an enlarged diameter and will prevent or minimize shock that might otherwise occur during operation of the system. Probes 42 and 44 may be used to measure pressures at opposite ends of the shock tube 40.

In normal or fill operation (i.e., where containers are being filled with product), the product goes from tank 34 through pump 36 and enters shuttle valve 38 at port 38M. The shuttle valve is in a fill or normal position where port 38M is open to both ports 38LL and 38LR, the later two also freely communicating with each other in that mode. No port is in communication with port 38U in that mode. The product entering port 38M exits 38LL, passes through flow meter 32 and out valve 12 into a container (not shown). In that mode, valve 18 will be closed such that little, if any, product will flow out port 38LR.

When valve 12 is closed, the pressure behind the valve will tend to suddenly jump and a hydraulic hammer or shock effect would normally occur. That may damage equipment over time and is to be avoided. Toward that end a return path 46 may be opened bye valve 12 is closed. Additionally, and importantly, the shuttle valve allows ports 38LL and 38LR to freely communicate in this normal mode. Therefore, the increase in pressure behind the closing valve 12 can pass through port 38LL to port 38LR and up into the larger diameter (i.e., larger than the pipes) shock tube 40. Therefore, the sudden increase in pressure will be minimized and ill effects can likewise be avoided or minimized.

When the system is to be cleaned, the present invention allows this to be done without temporarily connecting components to tube 40 or otherwise reconfiguring the system in such a way that reassembly of the pressurized parts is needed once the cleaning is done. That has been one of the disadvantages common to many known systems.

Instead, cleaning is accomplished without disassembly by operation of valve 38 and the related hydraulic circuits around shock tube 40. By connecting known cleaning in place (CIP) equipment 50 with a path 52 from the valve 12, a cleaning fluid is passed through the tank 34 to port 38M. Shuttle valve 38 will now be in a cleaning mode such that port 38M communicates only with port 38U and port 38LR communicates only with port 38LL. Valve 18 will be open. Therefore, the cleaning fluid goes from port 38M to port 38U through valve 18 and through the shock tube 40 and onward to port 38LR to port 38LL. From there, the cleaning fluid goes through flow meter 32 and valve 12 to return 52. Advantageously, nothing needed to be connected temporarily to shock tube 40. The present system allows the shock tube 40 to be cleaned without disassembly and reassembly of portions of the pressurized circuits between tank 34 and valve 12.

After completion of the cleaning operation, the draining operation involves having all ports 38M, 38U, 38LR, and 38LL being communicating with each other such that air from source 54 is supplied through the system to help drain all the cleaning fluid. Other arrangements for draining could be used.

Although specific embodiments have been disclosed above, it will be understood that these are for illustrative purposes only. Various modifications and adaptations will be apparent to those of skill in the art. Therefore, the scope of the present invention will be determined by reference to the claims appended hereto.

What is claimed is:

1. A product fill system comprising:

a filler valve at a fill end of a circuit such that a product flows in a path from a source of the product through the filler valve during a fill operation; a shock tube in communication with the circuit; and a mode valve connected to the circuit and the shock tube is connected to the path via the mode valve, and the mode valve includes:

a fill mode in which any overpressure caused by shut off of the filler valve will travel through the mode valve into the shock tube; and a clean mode in which passage of a cleaning material from the source is directed from the mode valve through a first end of the shock tube and out a second end of the shock tube towards the filler valve by way of the mode valve.

2. The product fill system of claim 1 wherein the mode valve has first, second, third, and fourth ports.

3. The product fill system of claim 2 wherein the mode valve, when disposed in the fill mode, has communication between the first, second, and third ports and the fourth port is not in communication with other ports.

4. The product fill system of claim 3 wherein the mode valve, when disposed in the clean mode, has communication between the first and fourth ports and separate communication between the second and third ports.

5. The product fill system of claim 4 wherein the mode valve, when disposed in the clean mode, is operable to pass cleaning material from the third port to the second port.

6. The product fill system of claim 5 further comprising a shock tube valve between the mode valve and the first end of the shock tube, the shock tube valve being closed when the mode valve is in the fill mode and being open when the mode valve is in the clean mode.

7. The product fill system of claim 1 wherein, with the mode valve in the fill mode, any overpressure caused by shut off of the filler valve will travel through the mode valve to enter the second end of the shock tube.

8. A product fill system comprising:

a filler valve at a fill end of a circuit such that a product flows in a path from a source of the product through the filler valve during a fill operation;

a shock tube in communication with the circuit, the shock tube having first and second ends; and a mode valve connected to the circuit and the shock tube is connected to the path via the mode valve; and the mode valve includes a fill mode in which any overpressure caused by shut off of the filler valve will travel through the mode valve into the second end of the shock tube; and a clean mode in which passage of a cleaning material from upstream of the mode valve on the path is directed from the mode valve through the first end of the shock tube and out the second end of the shock tube towards the filler valve.

9. The product fill system of claim 8 wherein, in the clean mode, the mode valve directs cleaning material from the second end of the shock tube towards the filler valve.

10. The product fill system of claim 8 wherein the mode valve has first, second, third, and fourth ports.

11. The product fill system of claim 10 wherein the mode valve, when disposed in the fill mode, has communication between the first, second, and third ports and the fourth port is not in communication with other ports.

12. The product fill system of claim 10 wherein the mode valve, when disposed in the clean mode, has communication between the first and fourth ports and separate communication between the second and third ports.

13. The product fill system of claim 4 wherein the mode valve, when disposed in the clean mode, is operable to pass cleaning material from the third port to the second port.

14. The product fill system of claim 13 further comprising a shock tube valve between the mode valve and the first end of the shock tube, the shock tube valve being closed when the mode valve is in the fill mode and being open when the mode valve is in the clean mode.

15. The product fill system of claim 14 wherein, with the mode valve in the fill mode, any overpressure caused by shut off of the filler valve will travel through the mode valve to enter the second end of the shock tube.

16. The product fill system of claim 8 further comprising a shock tube valve between the mode valve and the first end of the shock tube, the shock tube valve being closed when the mode valve is in the fill mode and being open when the mode valve is in the clean mode.

17. The product fill system of claim 8 wherein, with the mode valve in fill mode, any overpressure caused by shut off of the filler valve will travel through the mode valve to enter the second end of shock tube.

18. A method comprising:

using a mode valve to dispose a product fill system in a fill mode in which a product goes from a product source through the mode valve to a filler valve and in which any overpressure from the closing of the filler valve passes through the mode valve and enters one end of a shock tube; and switching the mode valve into a clean mode such that cleaning material passes from the circuit upstream of the mode valve through the mode valve to an opposite end of the shock tube and out the one end of the shock tube.

19. The method of claim 18 wherein, with the mode valve in fill mode, any overpressure caused by shut off of the filler valve will travel through the mode valve to enter the one end of shock tube via first, second and third ports in the mode valve.

20. The method of claim 19 wherein the switching of the mode valve into clean mode allows communication between first and fourth ports in the mode valve and separate communication between second and third ports in the mode valve.

* * * * *